Figure 1:
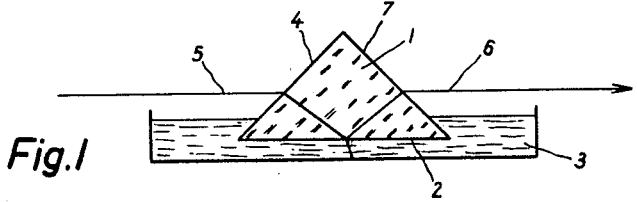

Nov. 6, 1962                    H. M. BOLZ                    3,062,103
                              OPTICAL FILTER
                            Filed Sept. 15, 1959

*INVENTOR.*
HANS MARTIN BOLZ
*BY*

United States Patent Office 3,062,103
Patented Nov. 6, 1962

3,062,103
OPTICAL FILTER
Hans Martin Bolz, Überlingen (Bodensee), Germany, assignor to Bodenseewerk Perkin Elmer und Co. G.m.b.H., Überlingen (Bodensee), Germany
Filed Sept. 15, 1959, Ser. No. 840,091
6 Claims. (Cl. 88—107)

This invention relates to an optical filter arrangement. The object of the invention is to provide a filter arrangement for passing a narrow range of wavelengths from a radiation beam containing a relatively broad range of wavelengths.

According to the invention, this object is accomplished by impinging a beam of radiation obliquely on the surface of a filter medium having a strong absorption band, so that total reflection takes place only within the range of the anomalous dispersion. As is well known, the refractive index decreases within the absorption band over a relatively small range of wavelengths and may even become smaller than one. Within this narrow range of wavelengths, the absorbing filter medium has a lower index of refraction than the adjacent medium so that total reflection takes place at the interface if a suitable angle of incidence is chosen. The rest of the radiation passes in a refracted condition through the interface. Advantageously, the beam of radiation enters the filter medium from another medium with a refractive index which, outside the absorption band, differs only slightly from the refractive index of the filter medium. Thus, practically no reflection takes place on the interface at frequencies outside the absorption band.

It has been found advantageous in constructing an infrared filter to pass the beam of radiation from sodium or potassium chloride (NaCl, KCl) into carbon tetrachloride ($CCl_4$). NaCl and KCl are permeable to infrared radiation and their respective refractive indices differ only slightly from that of the carbon tetrachloride. Carbon tetrachloride has, at a wavelength of only $12/u$, a strong absorption band.

Advantageously, the arrangement is conceived and designed by immersing the base of a roof shaped prism into the filter medium. The incident and reflected beams of radiation are refracted at the roof surfaces of the prism. It is then possible, with suitable sizing of the elements of this arrangement, to obtain a configuration wherein the totally reflected radiation continues along the extension of the axis of the incident beam of radiation.

Filters of the type described can be used wherever it is desired to work with a radiation of as accurately defined wavelength as possible. Otherwise such wavelengths can only be obtained in the infrared range at considerable expense. It is possible, for instance, with this arrangement to construct a very simple analyzer for infrared radiation which operates similar to a filter colorimeter.

The invention is more fully explained in the following detailed description with reference to an embodiment represented schematically in the accompanying drawings.

Figure 2:
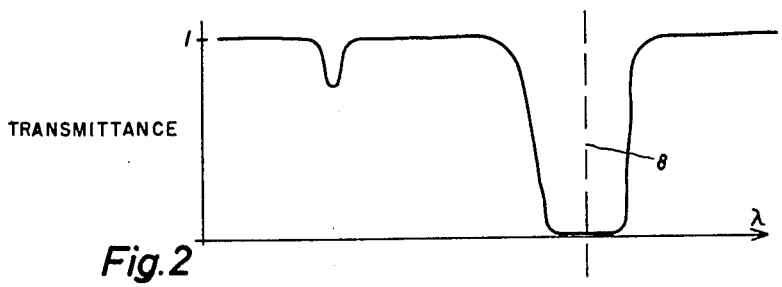
Figure 3:
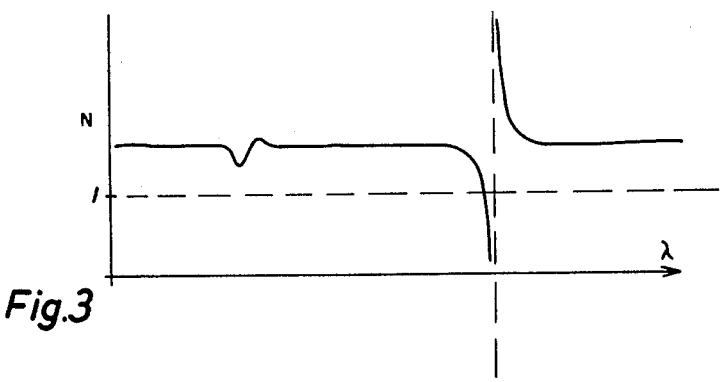

In the drawings:
FIG. 1 is a schematic representation of a filter arrangement in accordance with the invention;
FIG. 2 shows schematically the permeability of the filter medium ($CCl_4$) as a function of the wavelength;
FIG. 3 shows the refractive index as a function of the wavelength, and
FIG. 4 shows the intensity of the radiation reflected at the interface as a function of the wavelength.

Referring to FIG. 1, numeral 1 designates a common salt prism with its base surface 2 immersed in a bath 3 of $CCl_4$. A beam of radiation 5 impinges upon a roof surface 4 of the prism 1 and is refracted toward base surface 2. The beam of radiation 5 substantially passes through the surface 2 and enters the $CCl_4$. Only a narrow range of wavelengths is totally reflected. These reflected rays 6 are refracted at the second roof surface 7 of the prism 2, and in such a manner that they continue along the extension of the axis of the incident beam of radiation.

Figure 4:
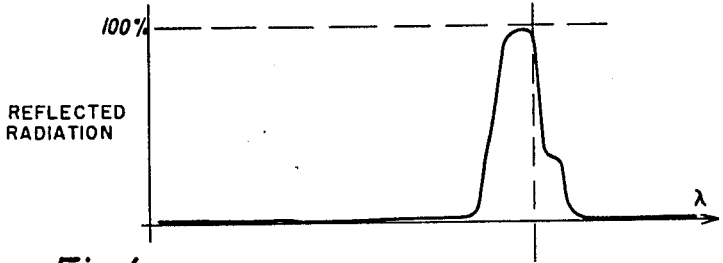

The spectral distribution of the reflected radiation, measured in percent of the incident radiation, is shown in FIG. 4. It will be seen that the filter permits a sharply defined range of wavelengths to "pass through" almost completely (96% and even more), while all the other radiation is as completely filtered out.

For purposes of explanation of this phenomenon, reference is made to FIGS. 2 and 3. FIG. 2 represents the transmittance of the filter medium ($CCl_4$) as a function of the wavelength. This shows a very strong absorption band 8. The refractive index of the medium within the range of such an absorption band has, as is known, a characteristic as shown in FIG. 3. It will be readily seen that the refractive index, which is almost constant throughout the rest of the range, suddenly drops abruptly on the left side of the band and may attain values which are considerably smaller than one. It suddenly ascends again to reach very great values and then drops again to its original value.

If the beam of radiation 5 is guided in such a manner that it hits with a rather steep slope the base surface 2, normally, no total reflection will take place. Total reflection will take place only at those wavelengths for which the refractive index drops below that of the prism. As this is the case within the range of the anomalous dispersion, the conditions for a total reflection are also fulfilled with this angle of incidence. Within this range, the radiation is reflected with very small losses.

Within the range of the normal dispersion, the low index range is followed immediately by wavelengths having high indices of refraction. Thus an abrupt transition occurs in the optical density at the surface 2 which, in accordance with well known laws, also causes strong reflection. This results in the smaller hump in the band pass width curve of the filter, which can be seen on the right of FIG. 4.

The width at half maximum intensity of the band pass range can be changed by varying the angle of incidence or by changing the divergence or the convergence respectively of the beam of radiation.

It is of course possible, instead of a liquid such as $CCl_4$ to use any other suitable substances. For instance, the prism 1 could also be coated on its lower portion, with a suitable plastic material.

Depending upon the spectral range within which the filter is intended to be used, other materials, e.g., LiF, $CaF_2$ or $BaF_2$ can be used for the prism.

I claim:
1. Apparatus for selecting a specific band of wavelengths from a beam of radiation which comprises means for forming a beam of said radiation; a first medium in the path of said beam transparent to the wavelengths to be selected; a second medium having a region of anomalous dispersion at the selected wavelengths and characterized by indices of refraction lower than those of the first medium at said selected wavelengths and at least substantially equal to those of the first medium at the non-selected wavelengths; an interface formed by the juxtaposition of said first and second media, said interface being positioned such that the angle between the selected wavelengths incident thereon and the normal to said interface is greater than the critical angle for the selected wavelengths whereby said selected wave- lengths are substantially reflected at the interface while said non-selected wavelengths are substantially refracted.

2. The apparatus of claim 1 wherein said first medium is a dispersion prism.

3. The apparatus of claim 2 wherein said radiation is infrared radiation.

4. The apparatus of claim 3 wherein said second medium is carbon tetrachloride.

5. The apparatus of claim 4 wherein said prism is sodium chloride.

6. An optical filter comprising a first element transparent to a selected band of radiation wavelengths; a second element having a region of anomalous dispersion at the selected wavelengths and characterized by indices of refraction lower than those of the first element at said selected wavelengths and at least substantially equal to those of the first medium at non-selected wavelengths; an interface formed by the juxtaposition of said first and second elements and positioned such that the angle between the selected wavelengths incident thereon and the normal to said interface is greater than the critical angle for the selected wavelengths, whereby said selected wavelengths are substantially reflected at the interface while said non-selected wavelengths are substantially refracted.

References Cited in the file of this patent

FOREIGN PATENTS 674,294     Germany _____ Apr. 12, 1939

OTHER REFERENCES

Pfund: "The Dispersion of $CS_2$ and $CCl_4$ in the Infrared," article in "The Journal of the Optical Society of America," vol. 25, No. 11, November 1935, pages 351–354 cited.